Patented Sept. 19, 1939

2,173,097

UNITED STATES PATENT OFFICE 2,173,097

PAPER CARRIER SHEET FOR TACKY RUBBER AND PROCESS OF MAKING SAME

George W. Coggeshall, Yarmouth, Maine, assignor to S. D. Warren Company, Boston, Mass., a corporation of Massachusetts No Drawing. Application August 22, 1936, Serial No. 97,471

3 Claims. (Cl. 91—68)

This invention relates to a process of making a strong, tough, non-splitting, non-adhesive paper sheet having properties adapting it for use as a carrier for tacky rubber in the rubber industry; also, to the product of that process.

According to the present invention, I make a strong and tough paper sheet having a smooth and dense surface from which tacky sheet rubber will easily separate clean and glossy with no impairment of its surface, with its full tackiness, and without material "picking." The process by which this product is produced comprises, in general, preparing a strong and tough "non-splitting" web (e. g., paper web), impregnating and/or coating the web with suitable compositions and friction calendering.

The properties of the new product will, hereinafter, be described with reference to one following particular use of the same in the rubber industry. In preparing a rubber patch material a special rubber mass is sheeted onto a web of my specially prepared paper material by squeezing rubber "gum", containing no vulcanizing agents, onto the latter as it passes between two rolls of the rubber-calendering machine, a layer of predetermined thickness of the "gum" being carried down on the upper, heated, roll of the pair to the point where the layer meets the paper whereupon the hot "gum" layer is forcibly transferred to the latter. Thereafter, and by a similar operation, a layer (usually much thicker) of rubber mix containing vulcanizing ingredients is applied on top of the tacky rubber layer. When the resulting laminated product is subjected to vulcanizing conditions (i. e., heated in an oven to a relatively high temperature) the outer, thicker, layer of rubber mix is vulcanized or "cured" while the rubber layer next to the paper remains unvulcanized and tacky (and therefore able to adhere well to another surface when the protecting layer of paper is removed, at the time of use of the patch). In the course of manufacture, it is customary to roll the partly fabricated, or completely fabricated, laminated article on itself and later unroll it; accordingly, both sides of the paper should be finished alike and be equally capable of separating easily from rubber, without "picking." Considerable strain is put upon the paper in such rolling and unrolling, during the "curing" of the rubber, and at the time of eventual use: consequently, the paper must be strong, tough and non-splitting.

Hitherto, it has been considered necessary to use as the carrying, separating and protecting layer of a laminated rubber patch article a specially woven and prepared textile material, which is a strong cloth, generally white in color, having a filled construction and a glossy finish. This specially prepared cloth generally is not damaged or discolored during the fabrication of the laminated article (e. g., in the "curing" operation, and it may easily be parted from the adjacent tacky rubber without considerable "picking" of the material with which the cloth is filled. The prepared cloth is, however, somewhat objectionable on the ground of "picking." But the most objectionable feature of the cloth is its high cost.

Because of the high cost of the above-described cloth many prior investigators have attempted (fruitlessly, so far as I am aware) to produce an operable paper substitute therefor. These prior attempts failed for one or another of the following reasons: the paper products were not strong enough to undergo the machine operations in the rubber factories without tearing or splitting; the surfaces of the papers were not of such a composition and/or physical condition that would allow the rubber and paper to be cleanly and easily separated at a later time or after having been in the curing oven; the paper was stained by oily or other materials in the rubber mixture; and the rubber sheet, when separated from the paper, lost some of its original tackiness and luster.

1. For the basis of the new product, I lay up a paper web from a strong stuff (i. g., sulphate or craft pulp, preferably bleached) which has been beaten only moderately (say, for one-half hour), with only slight hydration, well felting the fibers on the machine. A representative weight of sheet is about 87 pounds per ream (24 x 36—480). At this stage, the sheet should have a Mullen test of at least 75 pounds, and preferably from 85 to 90 pounds. No filler or engine size is used: consequently, the resulting web, while being well formed, is absorbent.

2. As the next step, I impregnate the web with a suitable impregnating agent or agents. This operation either (a) may be integrated with the normal drying of the web, as by passing the partially dried web through a suitable impregnating bath and then concluding the drying operation, or (b) may be practiced on the already dried web. In either event, the web is subjected to the liquid impregnating composition, excess liquid is removed, and the web is at once dried (e. g., on the customary drying rolls): the web may or may not be then given a light stack calendering.

The impregnation treatment serves to increase the strength and toughness of the web; moreover, it imparts to the latter a greatly increased resistance to splitting. Certain specific impregnating compositions are described hereinafter.

A representative increase in weight due to the impregnating step is 7 pounds per ream, the sheet then weighing about 94 pounds. The Mullen test has been increased to 120 or over. The paper is extremely tough and flexible, and has a split test value of 400 grams or greater.

3. The so-impregnated sheet is then treated to improve its smoothness, surface flatness, and firmness, and gloss. This involves super- or friction-calendering. For grades of rubber with which extremely high gloss is not required, the paper may be satisfactorily finished by plain or supercalendering; when a high gloss is required, friction-calendering is preferred. While these desiderata may be satisfied merely by (a) supercalendering or friction-calendering to a high finish, I prefer to (b) give the web, preliminary to the calendering or friction-calendering, a surface-impregnating coating with a suitable fluid paper-coating composition, because thereby I am enabled to obtain a smoother and firmer surface and one which, upon the subsequent calendering, will have a flatter lay and take a higher gloss. This surface-impregnating coating operation, where resorted to, may make use of one or another of various compositions generally including pigments and adhesives, with or without modifying agents, two such compositions being described hereinafter. The composition which may contain little or even no pigment in specific circumstances is applied to both sides of the sheet, which is then dried.

When resorting to the above-described surface-impregnating coating, I prefer so to adjust the application that the dried sheet increases in weight about 7 pounds per ream (i. e., total weight about 101 pounds). The Mullen test is 120 or over and the split test is 400 or greater. It is permissible and sometimes preferable in the first impregnating step, and also in the surface-impregnating step, to add more than seven pounds to the weight of the sheet.

The sheet, after being treated as described under 3b above, is then friction-calendered, resulting in a high surface gloss and luster. While I prefer to friction-calender both sides of the sheet, it is within the scope of this invention to friction-calender but one side of the sheet, the other side being left uncalendered or plain calendered or friction calendered to a less degree.

For the impregnating bath of step 2 above, I use a water "solution" of some adhesive (e. g., glue, casein, or starch): in some cases casein is preferred. The casein solution is prepared by dissolving, with moderate or no heating, swelled casein in water containing an alkaline dissolving assistant, such as ammonia, borax, or the like. After cooling I add some flexibilizer (e. g. glycerin) and, while vigorously stirring, commercially aqueous formaldehyde solution. Preferably I add enough of the formaldehyde solution to make the composition substantially non-alkaline to slightly acid. This has the result of reducing the viscosity of the bath, making the same sufficiently "thin" readily to penetrate the paper in quantity sufficient to produce the desired strengthening and toughening effects. I may omit the formaldehyde and use the alkaline casein solution. A representative formula for the formaldehyde-casein solution is:

|  | Per cent |
|---|---|
| Dry casein | 8.0 |
| Concentrated NH4OH solution | 0.5 |
| 40% commercial formaldehyde solution | 1.0 |
| Glycerin | 2.0 |
| Water | 88.5 |

Control of the amount of impregnating agent added to the paper web is effected by manipulation of the strength and temperature of the bath, time of immersion, locations of the dip and other guide rolls in the bath, speed of web movement, pressure of the squeeze rolls through which the impregnated sheet passes on its way to the driers, control of the viscosity of the bath, etc.

To illustrate: The solution is about 12 inches deep in a vat. The vat is wider than the sheet and about 8 feet long. The sheet from a roll continuously enters the solution near one end of the vat, passes under a submerged dip-roll near the bottom of the vat, then passes over a submerged roll near the surface of the solution, under another low dip roll, up over another roll near the surface, down under a final low dip-roll, then out of the vat, to squeeze-rolls where excess solution is removed. Bending the paper in the solution makes for better penetration. The sheet running from 125 to 150 feet per minute gives the time of immersion about $\frac{1}{10}$ minute. The solution is at room temperature. The squeeze rolls are about 16 inches in diameter, the top roll hard-rubber covered. Its weight can be altered but usually the pressure on the wet sheet is about 25 lbs. per inch of sheet width. The sheet passes direct to a conventional series of drying drums such as is used on paper-making machines, and through a stack nip and wound up.

When I use the casein in an alkaline solution, the viscosity of the solution is somewhat greater, yet its use is operable and the impregnating conditions are altered so that the same amount is introduced into the sheet.

While, as above noted, I prefer, in some cases, to use a casein impregnating bath, the following has been found more generally useful:

|  | Per cent |
|---|---|
| Modified starch | 7.0 |
| Glycerin | 1.0 |
| Water | 92.0 |

This starch bath is more viscous than is the casein bath; consequently, it is more difficult to apply the desired amount (i. e., 7 pounds per ream, more or less). A re-impregnation sometimes is necessary with the starch bath.

Where the impregnated web is to be given the surface-impregnating coating alluded to in 3b above, the composition therefor may contain an adhesive, for example, casein or starch, a flexibilizer (e. g. glycerin), and more or less pigment, such as clay, titanium oxide, blanc fixe, and the like with or without tinting color. Either of the following formulas is useful

|  | I | II |
|---|---|---|
|  | Parts by weight | Parts by weight |
| Clay | 74.7 | 35.0 |
| Titanium oxide | 10.0 | 10.0 |
| Glycerin | 1.3 | 5.0 |
| Casein | 13.0 |  |
| Aqueous ammonia | 1.0 |  |
| Modified starch |  | 50.0 |
| Water | 200.0 | 567.0 |

This impregnating-coating step is made to fill the under surface spaces of the sheet which have not been filled by the previous impregnation (step 2) and for this purpose solid pigments are present in the mixture. I also prefer starch as the adhesive for several reasons, one being that the starch filled sheet is whiter and remains whiter during subsequent vulcanizing oven treatment, and another reason being that the flexibilized starch surface-filled sheet takes a beautiful lustre when friction calendered.

This step gives the sheet a filled close surface, almost a coated surface, which calendars to a flat glossy finish.

It is understood that while in step 1 any strong pulp may be used whatever the process of cooking or preparation, or the color, and in step 2 any adhesive, properly flexibilized or softened, as by glycerin or other flexibilizer or softener (such as triethanolamine, or softeners of the sugar type, or any other); and, in step 3, any properly flexibilized adhesive may be used, to the production of finished sheets which are useful with tacky rubber mixes, yet some pulps selected for step 1 will turn yellow or brown during the oven curing heat treatment; and casein adhesive used in steps 2 and 3 and certain flexibilizers used in these steps will discolor during long continued oven curing necessary with certain types of rubber mixes. Therefore, although such discolorations of the sheet are not detrimental to the use of the so-prepared sheet yet in order to comply with the desire and custom of the rubber manufacturing trade it is desirable in step 1 to select a pulp which will not discolor during the curing heat treatment and in steps 2 and 3 to use grades of modified starch and flexibilizers which also will not discolor under such curing treatment. Tinting color as a corrective may be used where only slight yellowing of pulp or adhesive occurs. The formulae above given are illustrative of those which may be used and I do not limit myself to the exact formulae given but variations may be made so long as they come within the scope of the claims.

The split test to which I referred in giving split test values after steps 2 and 3 (b) above is practiced as follows: The split test machine carries two 1¼ inch wide rollers, one 3 inches in diameter, the other ⅝ inch in diameter. Both are mounted on horizontal bearings and each is free to turn easily. The centers of the two rollers are in the same horizontal plane and there is a space of 1/16 inch width between the circumferences of the two rollers. The 3 inch roll carries two clamps for holding paper strips. These clamps are close together on the circumference of the roll. A sheet of the paper to be tested is cut 12 inches long (in the machine direction) by several inches wide. A sheet of dense strong cloth such as friction tape, or a sheet of very strong paper, for example, vulcanized fiber paper, is cut to the same size for a backing sheet. The sheet to be tested is glued to the backing sheet over a surface beginning 5 inches from one end and extending about 4½ inches, which leaves un-glued 5 inches at one end and 2½ inches at the other end. The combined pair of sheets is then cut into lengthwise strips ½ inch wide. It is important that the glue be a strong glue and dried and that the line 5 inches from the upper end where the gluing starts be at right angles to the strips and that it be a straight line and not irregular. The bottom of the double strip is passed down between the two rolls and carried around the 3 inch roll and clamped with the backing strip against the roll. The other end of the backing strip is then clamped also, so that this strip fits the 3 inch roll closely. The free end of the strip to be tested is then brought out over the small roll and attached to a horizontal pulling device operated by a crank. Set into this pulling device, between the place where the tested strip is attached and the crank, is a spring tension carrying a calibrated indicator which shows grams pull. When tension is applied by the crank the strip being tested pulls tightly over the ⅝ inch roll and finally a break occurs. The tested strip splits and the grams-pull is shown. This figure of grams pull is for a strip ½ inch wide which is reduced to a corresponding figure 1 centimeter wide. The pull is exerted at a constant rate. The result is an average of 5 or more individual pull tests.

This application contains subject matter in common with my applications Serial Nos. 81,123, filed May 21, 1936, and 90,993, filed July 16, 1936.

I claim:

1. Method of making a paper liner for use in contact with a tacky rubber surface of an article, which comprises deeply impregnating a strong, tough paper web with a fluid composition consisting essentially of a dispersion of a water-soluble organic adhesive and a plasticizer therefor, whereby to increase the strength, toughness and split-resistance of the paper, thereafter surface coating the impregnated paper web with an aqueous filler consisting essentially of flexibilized starch, and friction-calendering at least one side of the impregnated and surface filled web, whereby to impart to at least one surface of the web a glossy non-adhering character such that the paper readily may be parted from tacky rubber.

2. Method of making a paper liner for use in contact with a tacky rubber surface of an article, which comprises deeply impregnating a strong, tough paper web with a fluid composition consisting essentially of a dispersion of casein and glycerin; whereby to increase the strength, toughness and split-resistance of the paper, and thereafter imparting to both surfaces of the paper a glossy non-adhering character, such that the paper readily may be parted from tacky rubber, by surface-coating with an aqueous filler composition consisting essentially of flexibilized starch and pigment and friction-calendering the surface-coating.

3. A paper liner for use on a tacky rubber-surfaced article, said paper liner having a Mullen test of at least 120 pounds and a split test of at least 400, and comprising a strong tough sheeted paper base having, per se, a Mullen test of at least 75 pounds and deeply impregnated with water-soluble organic adhesive and a plasticizer therefor and surface filled with flexibilized starch coating, at least one side of the paper liner having a smooth glossy friction-calendered surface, which is separably adherent to tacky rubber.

GEORGE W. COGGESHALL.